(12) United States Patent
Dugar et al.

(10) Patent No.: US 8,453,460 B2
(45) Date of Patent: Jun. 4, 2013

(54) APPARATUS AND METHOD FOR COOLING A COMBUSTOR

(75) Inventors: Saurav Dugar, West Bengal (IN); Matthew P. Berkebile, Mauldin, SC (US); Dullal Ghosh, Bangalore (IN); Joseph Vincent Pawlowski, Phoenix, AZ (US); Krishnakumar Pallikara Gopalan, Bangalore (IN); Marcus Byron Huffman, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/494,297

(22) Filed: Jun. 12, 2012

(65) Prior Publication Data
US 2012/0247120 A1 Oct. 4, 2012

Related U.S. Application Data

(62) Division of application No. 12/880,446, filed on Sep. 13, 2010, now Pat. No. 8,201,412.

(51) Int. Cl.
*F02C 1/00* (2006.01)
(52) U.S. Cl.
USPC .............................. 60/772; 60/752
(58) Field of Classification Search
USPC ................... 60/39.37, 752–760, 772
See application file for complete search history.

(56) References Cited

U.S. PATENT DOCUMENTS

| 2,638,745 | A | | 5/1953 | Nathan |
| 2,993,337 | A | | 7/1961 | Cheeseman |
| 3,840,332 | A | * | 10/1974 | Smith ........................... 431/351 |
| 4,606,721 | A | * | 8/1986 | Livingston .................... 431/116 |
| 5,724,816 | A | | 3/1998 | Ritter et al. |
| 6,134,877 | A | | 10/2000 | Alkabie |
| 6,494,044 | B1 | | 12/2002 | Bland |
| 6,681,578 | B1 | | 1/2004 | Bunker |
| 6,761,031 | B2 | | 7/2004 | Bunker |
| 6,968,672 | B2 | * | 11/2005 | Tiemann ...................... 60/39.37 |
| 7,010,921 | B2 | | 3/2006 | Intile et al. |
| 7,104,067 | B2 | | 9/2006 | Bunker |
| 7,373,778 | B2 | | 5/2008 | Bunker et al. |
| 7,594,401 | B1 | | 9/2009 | Chen et al. |
| 2008/0256956 | A1 | * | 10/2008 | Poyyapakkam ................ 60/755 |
| 2009/0019855 | A1 | * | 1/2009 | Venkataraman et al. ....... 60/738 |
| 2009/0235668 | A1 | | 9/2009 | Johnson et al. |
| 2011/0016869 | A1 | | 1/2011 | Iwasaki |

* cited by examiner

*Primary Examiner* — Phutthiwat Wongwian
(74) *Attorney, Agent, or Firm* — Dority & Manning, PA

(57) ABSTRACT

A combustor includes a combustion chamber and an interior wall circumferentially surrounding at least a portion of the combustion chamber and defining an exterior surface. A plurality of turbulators are on the exterior surface. The combustor further includes means for preferentially directing fluid flow across a predetermined position of the turbulators. A method for cooling a combustion chamber includes locating a plurality of turbulators to an exterior surface of the combustion chamber and preferentially directing fluid flow across a predetermined position of the plurality of turbulators.

13 Claims, 4 Drawing Sheets

APPARATUS AND METHOD FOR COOLING A COMBUSTOR

RELATED APPLICATIONS

The present application is a divisional application of U.S. application having Ser. No. 12/880,446 filed on Sep. 13, 2010, which is incorporated herein in its entirety by reference thereto for all purposes. Any disclaimer that may have occurred during prosecution of the above-referenced application(s) is hereby expressly rescinded.

FIELD OF THE INVENTION

The present invention generally involves an apparatus and method for cooling a combustor. Specific embodiments of the present invention may include a combination of a flow sleeve and turbulators arranged at predetermined locations on an exterior surface of the combustor to improve the heat transfer from the combustor.

BACKGROUND OF THE INVENTION

Gas turbines are widely used in industrial and power generation operations. A typical gas turbine includes an axial compressor at the front, one or more combustors around the middle, and a turbine at the rear. Ambient air enters the compressor, and rotating blades and stationary vanes in the compressor progressively impart kinetic energy to the working fluid (air) to produce a compressed working fluid at a highly energized state. The compressed working fluid exits the compressor and flows through nozzles in the combustors where it mixes with fuel and ignites to generate combustion gases having a high temperature, pressure, and velocity. The combustion gases flow to the turbine where they expand to produce work. For example, expansion of the combustion gases in the turbine may rotate a shaft connected to a generator to produce electricity.

It is widely known that the thermodynamic efficiency of a gas turbine increases as the operating temperature, namely the combustion gas temperature, increases. Combustion gas temperatures exceeding 3000° F. are therefore desirable and fairly common in the industry. However, conventional combustion chambers and transition pieces that channel the combustion gases out of the combustor are typically made from materials generally capable of withstanding a maximum temperature on the order of approximately 1500° F. for about 10,000 hours. Therefore, it is desired to provide some form of cooling to the combustion chamber and/or transition piece to protect them from thermal damage.

A variety of techniques are known in the art for providing cooling to the combustion chamber. For example, U.S. Pat. Nos. 5,724,816, 7,010,921, and 7,373,778 assigned to the same assignee as the present invention each describe various structures and methods for cooling a combustor and/or transition piece of a combustor. However, continued improvements in the structures and methods for cooling combustor components would be useful.

BRIEF DESCRIPTION OF THE INVENTION

Aspects and advantages of the invention are set forth below in the following description, or may be obvious from the description, or may be learned through practice of the invention.

One embodiment of the present invention is a combustor having a combustion chamber and an interior wall that circumferentially surrounds at least a portion of the combustion chamber. The interior wall defines an exterior surface and a longitudinal centerline. A plurality of turbulators are on the exterior surface of the interior wall. A sleeve circumferentially surrounds at least a portion of the interior wall, and the sleeve defines a plenum between the interior wall and the sleeve. A terminal end of the sleeve forms a perimeter around the interior wall, and the perimeter has a bellmouth shape around at least a portion of the perimeter.

Another embodiment of the present invention is a combustor having a combustion chamber and an interior wall circumferentially surrounding at least a portion of the combustion chamber. The interior wall defines an exterior surface and a longitudinal centerline. A plurality of turbulators are on the exterior surface of the interior wall. The combustor further includes means for preferentially directing fluid flow across a predetermined position of the plurality of turbulators.

The present invention may also include a method for cooling a combustion chamber. The method includes locating a plurality of turbulators to an exterior surface of the combustion chamber and preferentially directing fluid flow across a predetermined position of the plurality of turbulators.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
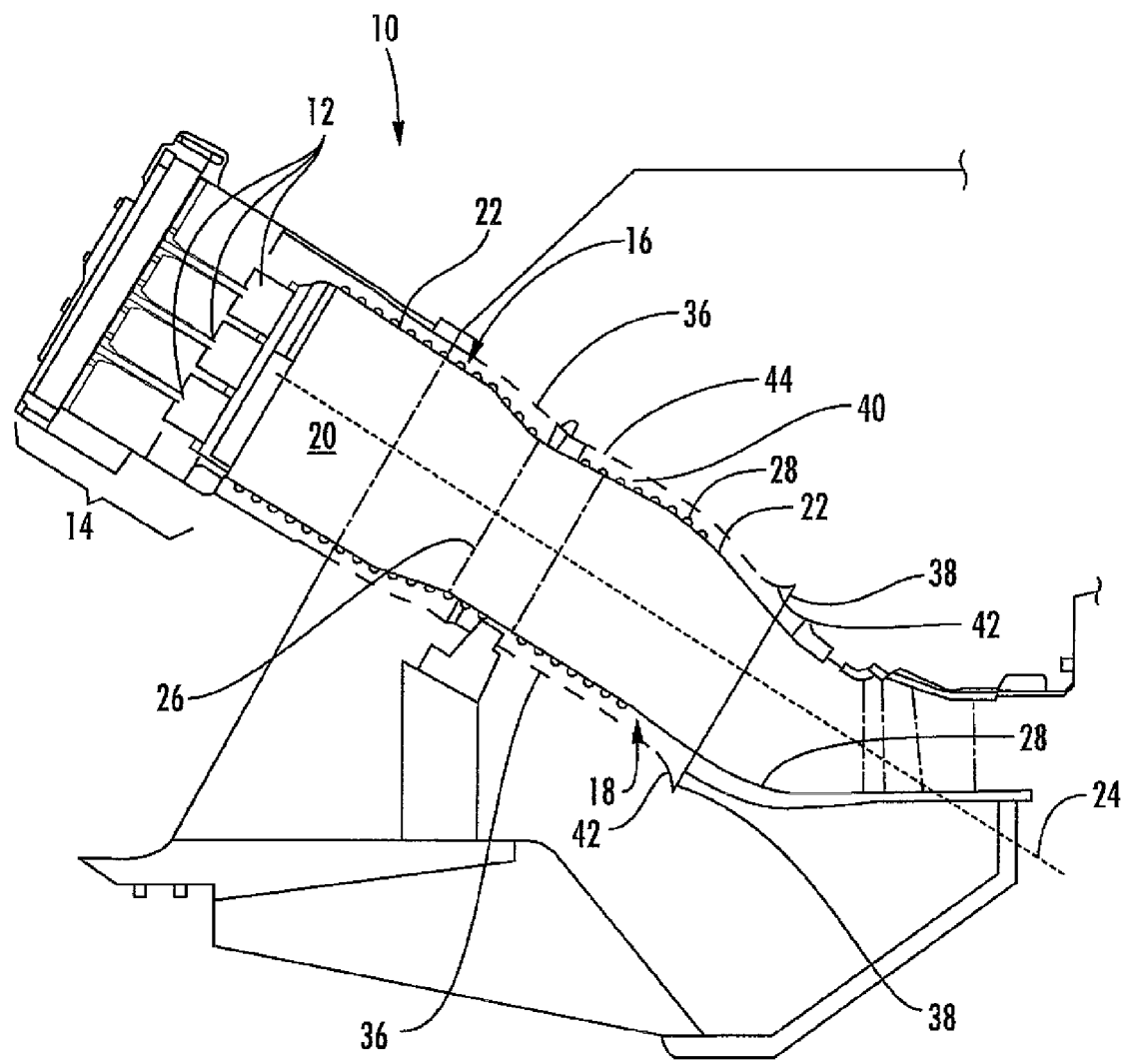
FIG. 1 is a simplified cross-section of a combustor according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 shows a simplified cross-section of a combustor 10 according to one embodiment of the present invention. As shown, the combustor 10 generally includes one or more nozzles 12 radially arranged in an end cap 14. For clarity, the nozzles 12 are illustrated in the figures as cylinders without any detail with respect to the type, configuration, or internal components of the nozzles 12. One of ordinary skill in the art will readily appreciate that the present invention is not limited to any particular nozzle type, shape, or design unless specifically recited in the claims.

A liner 16 and transition piece 18 circumferentially surround a combustion chamber 20 downstream of the end cap 14. The liner 16 and transition piece 18 define an exterior surface 22 and a longitudinal centerline 24 for the flow of compressed working fluid or air through the combustion chamber 20. The liner 16 and transition piece 18 may comprise a single, continuous piece that circumferentially surrounds the combustion chamber 20. Alternately, as shown for example in FIG. 1, the liner 16 and transition piece 18 may each comprise a separate interior wall joined by a seal 26 so that each circumferentially surrounds at least a portion of the combustion chamber 20. As shown in each of the figures, either or both of the interior walls 16, 18 may have a gradually decreasing circumference that focuses or concentrates the combustion gases exiting the combustor 10.

The combustor 10 further includes a plurality of turbulators 28 on the exterior surface 22 of either or both interior walls 16, 18. The turbulators 28 may comprise angled protrusions or indentions on the exterior surface 22 of one or both of the interior walls 16, 18 to disrupt the laminar flow of the compressed working fluid as it passes over the exterior surface 22 of the interior walls 16, 18. The turbulators 28 thus increase the effective surface area of the exterior surface 22 of the interior walls 16, 18 and may induce swirling in the compressed working fluid. The disruption of the laminar flow on the exterior surface 22 and increase in the effective surface area of the exterior surface 22 both contribute to increasing the swirl component of the velocity of the compressed working fluid over the exterior surface 22 to improve the coefficient of the transfer across the interior walls 16, 18 and facilitate cooling of the interior walls 16, 18. In addition, the increased turbulence in the compressed working fluid caused by the turbulators 28 may enhance the subsequent mixing of the compressed working fluid with the fuel to enhance the combustion in the combustion chamber 20.

Figure 2:
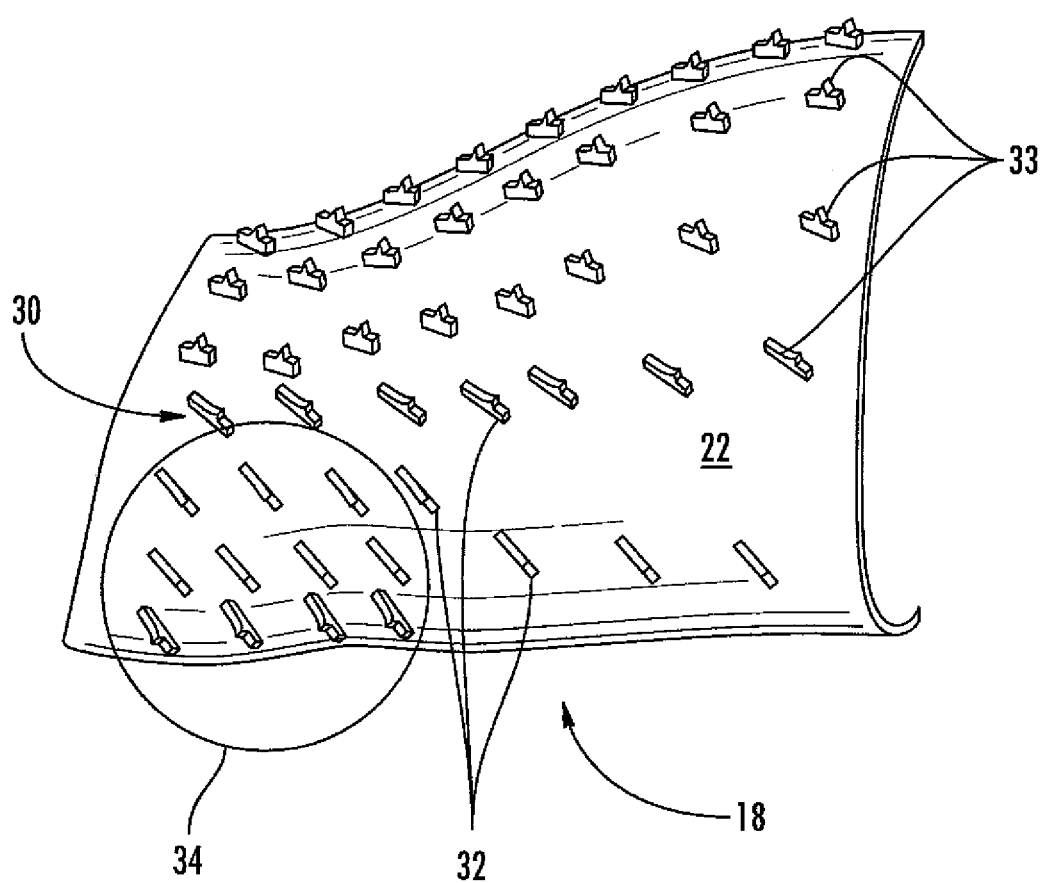
FIG. 2 is a perspective view of a transition piece according to one embodiment of the present invention.

The turbulators 28 may be protrusions or indentions on the exterior surface 22 having virtually any geometric shape, including circular, rectangular, triangular, trapezoidal, or any combination thereof. The turbulators 28 may be cast, welded, bolted, or otherwise attached to the exterior surface 22 of the interior walls 16, 18 using any suitable method known in the art and capable of withstanding the high temperature environment of the combustor 10. In particular embodiments, for example as shown in FIG. 2, the turbulators 28 may comprise a stepped protrusion 30 extending from the interior walls 16, 18. The stepped protrusion 30 may have a generally rectangular base 32 with a pointed end 33, similar to a fin with a winglet, distal from the interior walls 16, 18. The stepped protrusion 30 may enhance heat transfer by producing eddies or vortices over the exterior surface 22 of the interior walls 16, 18. As shown in FIG. 2, the turbulators 28 or stepped protrusions 30 may be arranged in an array of rows and columns to redirect the compressed working fluid flowing across the exterior surface 22 of the interior walls 16, 18 to further enhance the cooling provided by the compressed working fluid. In addition, a higher concentration of the turbulators 28 or stepped protrusions 30 may be located at a predetermined position 34 on the exterior surface 22 of the interior walls 16, 18. The predetermined position 34 may be an area on the exterior surface 22 of the interior walls 16, 18 that typically has a higher operating temperature based on empirical measurements and/or mathematical models. In this manner, the beneficial cooling effects provided by the turbulators 28 or stepped protrusions 30 may be enhanced at the predetermined position 34 known or expected to have higher operating temperatures.

The combustor 10 further includes means for preferentially directing fluid flow, for example the flow of the compressed working fluid, across the predetermined position 34 of the plurality of turbulators 28. Referring again to FIG. 1, the means for preferentially directing fluid flow may comprise a sleeve 36 with a terminal end 38 aligned approximately 90° from the longitudinal centerline 24 of the internal walls 16, 18. The sleeve 36 circumferentially surrounds at least a portion of one or both of the interior walls 16, 18 and is generally concentric with one or both of the interior walls 16, 18. As a result, the sleeve 36 defines a plenum 40 between the interior walls 16, 18 and the sleeve 36. The terminal end 38 of the sleeve 36 forms a perimeter around the interior walls 16, 18 and further includes a bellmouth shape 42 around at least a portion of the perimeter. As shown in FIG. 1, for example, the perimeter of the terminal end 38 of the sleeve 36 has a continuous bellmouth shape 42 around the entire perimeter. In this manner, the sleeve 36, terminal end 38, plenum 40, and bellmouth shape 42 combine to preferentially direct fluid flow through the plenum 40 and across the plurality of turbulators 28. As shown in FIG. 1, in particular embodiments the sleeve 36 may further include a plurality of apertures 44 to further allow fluid flow across the turbulators 28, although the presence of apertures 44 in the sleeve 36 is not a required structure for the means for directing fluid flow or a limitation of the present invention unless specifically recited in the claims.

Figure 3:
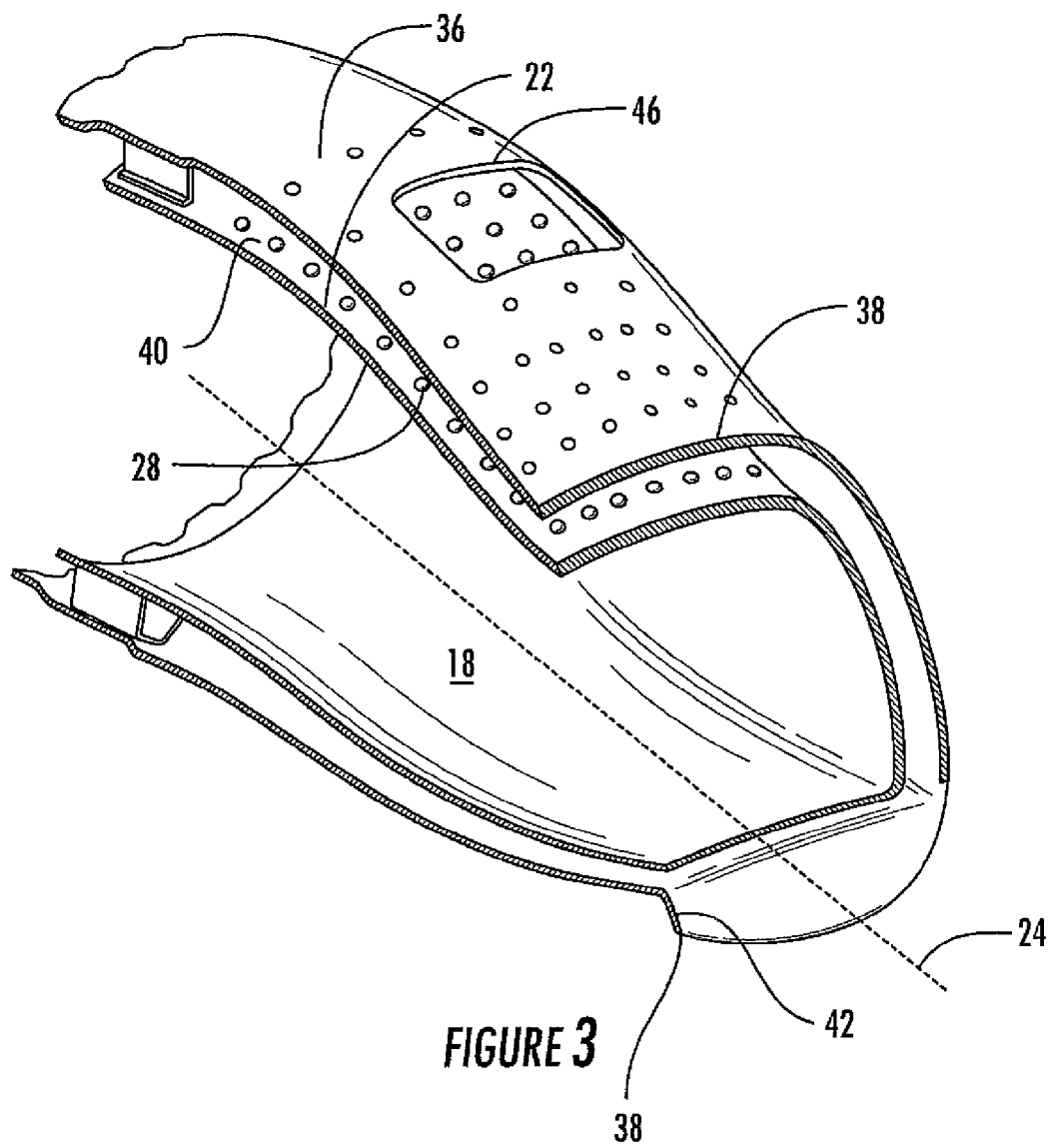
FIG. 3 is a perspective cutaway of a transition piece according to a second embodiment of the present invention.

FIG. 3 shows a perspective cutaway of the transition piece 18 portion of the combustion chamber 10 according to an alternate embodiment of the present invention. In this embodiment, the means for preferentially directing fluid flow comprises the sleeve 36, terminal end 38, plenum 40, and bellmouth shape 42 as previously described with respect to FIG. 1. In this particular embodiment, however, the terminal end 38 is aligned approximately 45° from the longitudinal centerline 24 of the internal wall 18. As shown in FIG. 3, the bottom portion of the terminal end 38 has a bellmouth shape 42, while the top portion of the terminal end 38 is generally straight. In addition, the means for preferentially directing fluid flow in this particular embodiment includes at least one enlarged opening 46 in the sleeve 36. The size and location of the enlarged opening 46 in the sleeve 36 may be selected to control the amount and location of fluid flow, and thus cooling, that is preferentially directed onto or across specific turbulators 28 on the external surface 22 of the interior wall 18. For example, the enlarged opening 46 may be sized so that the means for preferentially directing fluid flow covers less than approximately 90%, 80%, 70%, or 60% of the internal wall 18 and/or turbulators 28. In addition, or alternately, the enlarged opening 46 may be located proximate to the predetermined position 34 previously described with respect to FIG. 2 having a higher concentration of turbulators 28 and/or known or expected to have higher operating temperatures.

Figure 4:
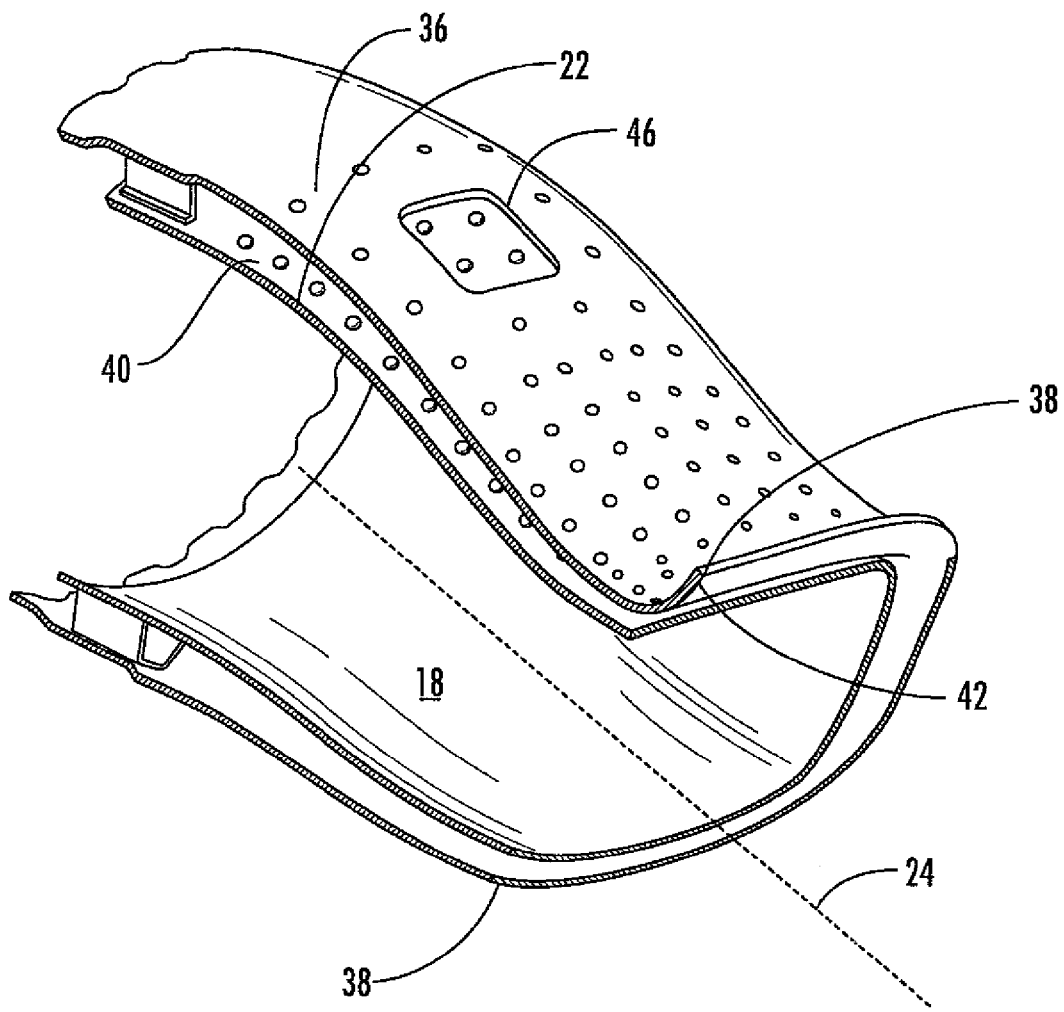
FIG. 4 is a perspective cutaway of a transition piece according to a third embodiment of the present invention.

FIG. 4 shows a perspective cutaway of the transition piece 18 portion of the combustion chamber 10 according to yet another alternate embodiment of the present invention. In this embodiment, the means for preferentially directing fluid flow comprises the sleeve 36, terminal end 38, plenum 40, and bellmouth shape 42 as previously described with respect to FIG. 1. In this particular embodiment, however, the terminal end 38 is aligned approximately 135° from the longitudinal centerline 24 of the internal wall 18. As shown in FIG. 4, the top portion of the terminal end 38 has a bellmouth shape 42, while the bottom portion of the terminal end 38 is generally straight. As with the embodiment shown in FIG. 3, the means for preferentially directing fluid flow in this embodiment again includes at least one enlarged opening 46 in the sleeve 36. The size and location of the enlarged opening 46 in the sleeve 36 may be selected to control the amount and location of fluid flow, and thus cooling, that is preferentially directed onto or across specific turbulators 28 on the external surface 22 of the interior wall 18. For example, the enlarged opening 46 may be sized so that the means for preferentially directing fluid flow covers less than between approximately 90%, 80%, 70%, or 60% of the internal wall 18 and/or turbulators 28. In addition, or alternately, the enlarged opening 46 may be located proximate to the predetermined position 34 previously described with respect to FIG. 2 having a higher concentration of turbulators 28 and/or known or expected to have higher operating temperatures.

One of ordinary skill in the art will appreciate that each of the embodiments described and illustrated in FIGS. 1 through 4 may be used to provide a method for cooling the combustion chamber 20. The method may include locating a plurality of turbulators 28 to the exterior surface 22 of the combustion chamber 20 and preferentially directing fluid flow across a predetermined portion of the plurality of turbulators 28. The predetermined portion of the plurality of turbulators 28 may exist, for example, near the bellmouth shape 42 of the distal end 38, under the enlarged opening 46, or any other desirable location on the exterior surface 22 of either or both of the interior walls 16, 18. The method may further include concentrating the plurality of turbulators 28 at the predetermined position 34 on the exterior surface 22 of the combustion chamber 20, as shown, for example, in FIG. 2.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. A method for cooling a combustion chamber comprising:
   a. locating a plurality of turbulators to an exterior surface of the combustion chamber;
   b. concentrating the plurality of turbulators at a predetermined position on the exterior surface of the combustion chamber;
   c. directing the fluid flow to an inlet of a sleeve through a plenum between the exterior surface and the sleeve that circumferentially surrounds at least a portion of the exterior surface and
   d. preferentially directing fluid flow through a plurality of apertures in the sleeve across the predetermined position of the plurality of turbulators.

2. The method as in claim 1, further comprising directing the fluid flow into a terminal end of the sleeve, wherein the terminal end of the sleeve forms a perimeter around the exterior surface and the perimeter has a flared opening around at least a portion of the perimeter to define an airflow inlet opening.

3. The method as in claim 2, further comprising directing the fluid flow into the terminal end of the sleeve aligned approximately 45° from a longitudinal centerline of the exterior surface.

4. The method as in claim 2, further comprising directing the fluid flow into the terminal end of the sleeve aligned approximately 90° from a longitudinal centerline of the exterior surface.

5. The method as in claim 2, further comprising directing the fluid flow into the terminal end of the sleeve aligned approximately 135° from a longitudinal centerline of the exterior surface.

6. A method for cooling a combustion chamber comprising:
   a. directing a fluid flow through a plenum between an exterior surface of the combustion chamber and a sleeve that circumferentially surrounds at least a portion of the exterior surface;
   b. concentrating a plurality of turbulators at a predetermined position on the exterior surface of the combustion chamber;
   c. directing the fluid flow to an inlet of a sleeve through a plenum between the exterior surface and the sleeve that circumferentially surrounds at least a portion of the exterior surface and
   d. preferentially directing the fluid flow through a plurality of apertures in the sleeve across the predetermined position of the plurality of the turbulators in the plenum.

7. The method as in claim 6, further comprising directing the fluid flow into the inlet forming at a terminal end of the sleeve, wherein the terminal end of the sleeve forms a perimeter around the exterior surface and the perimeter has a flared opening around at least a portion of the perimeter to define an airflow inlet opening.

8. The method as in claim 7, thither comprising directing the fluid flow into the terminal end of the sleeve aligned approximately 45° from a longitudinal centerline of the exterior surface.

9. The method as in claim 7, further comprising directing the fluid flow into the terminal end of the sleeve aligned approximately 90° from a longitudinal centerline of the exterior surface.

10. The method as in claim 7, further comprising directing the fluid flow into the terminal end of the sleeve aligned approximately 135° from a longitudinal centerline of the exterior surface.

11. A method for cooling a combustion chamber comprising:
    a. directing a fluid flow into a terminal end of a sleeve that circumferentially surrounds at least a portion of an exterior surface of the combustion chamber, wherein the terminal end of the sleeve forms a perimeter around the exterior surface and the perimeter has a flared opening around at least a portion of the perimeter to define an airflow inlet opening;
    b. concentrating a plurality of turbulators at a predetermined position on the exterior surface of the combustion chamber; and
    c. preferentially directing the fluid flow through a plurality of apertures in the sleeve across the predetermined position of the plurality of turbulators between the sleeve and the exterior surface.

12. The method as in claim 11, further comprising directing the fluid flow into the terminal end of the sleeve aligned approximately 45° from a longitudinal centerline of the exterior surface.

13. The method as in claim 11, further comprising directing the fluid flow into the terminal end of the sleeve aligned approximately 135° from a longitudinal centerline of the exterior surface.

* * * * *

UNITED STATES PATENT AND TRADEMARK OFFICE
CERTIFICATE OF CORRECTION

PATENT NO. : 8,453,460 B2
APPLICATION NO. : 13/494297
DATED : June 4, 2013
INVENTOR(S) : Saurav Dugar et al.

Page 1 of 1

It is certified that error appears in the above-identified patent and that said Letters Patent is hereby corrected as shown below:

In the Claims:

Claim 8, column 6, line 31 reads "The method as in claim 7, thither comprising" should read --The method as in claim 7, further comprising--

Signed and Sealed this
Third Day of September, 2013

Teresa Stanek Rea
*Acting Director of the United States Patent and Trademark Office*